Jan. 8, 1952     A. W. GARDNER ET AL     2,582,199
ROLLER-TYPE AGGREGATE COMPACTING DEVICE
Filed Jan. 24, 1947     7 Sheets-Sheet 1

ADRYL W. GARDNER
RUSSELL W. BYRNE
INVENTOR

BY
ATTORNEY

Jan. 8, 1952   A. W. GARDNER ET AL   2,582,199
ROLLER-TYPE AGGREGATE COMPACTING DEVICE
Filed Jan. 24, 1947   7 Sheets-Sheet 3

ADRYL W. GARDNER
RUSSELL W. BYRNE
INVENTOR

BY
ATTORNEY

Jan. 8, 1952 — A. W. GARDNER ET AL — 2,582,199
ROLLER-TYPE AGGREGATE COMPACTING DEVICE
Filed Jan. 24, 1947

ADRYL W. GARDNER
RUSSELL W. BYRNE
INVENTOR

Jan. 8, 1952     A. W. GARDNER ET AL     2,582,199
ROLLER-TYPE AGGREGATE COMPACTING DEVICE
Filed Jan. 24, 1947     7 Sheets-Sheet 5

ADRYL W. GARDNER
RUSSELL W. BYRNE
INVENTOR

BY
ATTORNEY

Jan. 8, 1952     A. W. GARDNER ET AL     2,582,199
ROLLER-TYPE AGGREGATE COMPACTING DEVICE
Filed Jan. 24, 1947                                             7 Sheets-Sheet 6

ADRYL W. GARDNER
RUSSELL W. BYRNE
INVENTOR

BY
ATTORNEY

Jan. 8, 1952 A. W. GARDNER ET AL 2,582,199
ROLLER-TYPE AGGREGATE COMPACTING DEVICE
Filed Jan. 24, 1947 7 Sheets-Sheet 7

ADRYL W. GARDNER
RUSSELL W. BYRNE
INVENTOR

BY
ATTORNEY

Patented Jan. 8, 1952

2,582,199

UNITED STATES PATENT OFFICE 2,582,199

ROLLER-TYPE AGGREGATE COMPACTING DEVICE

Adryl W. Gardner, Redlands, and Russell W. Byrne, Glendale, Calif., assignors to Gardner-Byrne Construction Company Incorporated, Los Angeles, Calif., a corporation of California Application January 24, 1947, Serial No. 723,940

16 Claims. (Cl. 94—50)

This invention relates to devices employed for the compaction of load-bearing surfaces of aggregate material, such as roads, airfields, playing fields, walks, etc., formed of soil, earth, soil-cement, road-oil mixtures, black-top, concrete, or other functionally comparable aggregate materials with or without added binder material or stabilizing agent, and pertains particularly to a device which not only serves to effect such compaction but is adapted also to push oversized rock or aggregate under and away from the face of the subgrade or away from surface material which may or may not be intended to have additional treatment.

Numerous devices have heretofore been proposed and employed for effecting surface compaction of aggregate materials, such as the well-known flat faced steel roller, and the more recent multiple-unit pneumatic tired roller, but such types of roller devices tend to produce a compaction of the immediate surface and forms a crust which is comparatively unstable against fracture or highly concentrated loads. Furthermore, these devices serve merely to push the oversize material flush with the surface, leaving them with little or no superior surface bonding, and such oversize material thus has a tendency to break away and start a surface "ravelling." Such a form of surface disintegration, when once started, usually spreads rapidly under heavy traffic.

The device of our invention provides a roller element of cylindrical configuration, having an aggregate-compacting surface adapted to produce a differential compacting effect upon the aggregate, and formed as a plurality of alternately disposed projections and openings, which element, when rolled over the aggregate material which is to be compacted, will present a multiplicity of high-pressure-concentration zones to contact with the aggregate, which zones are individually surrounded by openings affording low-pressure-concentration, thus producing direct compaction on a portion of the material at spaced high pressure points while allowing for positional adjustment of the particles located between such spaced points by movement of the aggregate particles toward the position of and into the low-pressure zones during pressure application, while at the same time restricting the freedom of lateral movement of such particles.

The positional adjustment of the individual aggregate particles is thus confined essentially to a vertical motion, with a minimum of lateral crowding of material. Where the high-pressure concentration zones are superimposed upon oversize aggregate particles, such as rocks, such particles are necessarily forced below the surface level, and the surrounding smaller particles are allowed to flow upwardly about the position of the depressed oversize particles, so that upon subsequent contact by the roller device, or in a finishing treatment as with a flat roller, the finer particles will be pushed down about and over the depressed oversize particles and a uniformly compacted surface structure will be produced.

The structure further provides for reception of a portion of the undersize aggregate through the openings which are distributed about the projections, which received undersized aggregate may later be dislodged from the openings and allowed to fall back through the openings onto the surface which is being worked upon.

In view of the above, it is an important object of our invention to provide a roller structure for the compaction of an aggregate material which comprises a grid-like roller member of generally cylindrical configuration provided with a plurality of spaced openings extending therethrough in the general direction of the application of pressure in the compacting operation, and solid elements extending between adjacent openings, to define interspersed high-pressure-concentration elements and low-pressure-concentration zones.

A further object of the invention is to provide a roller structure having alternately arranged peripherally disposed spaced projections and openings defining the above-mentioned interspersed high-pressure-concentration elements and low-pressure-concentration zones, in which the structural portions surrounding the spaced openings are so shaped that the openings are caused to be flared toward the outer periphery of the roller, whereby in use, the aggregate material being compacted is caused at least in part to be crowded laterally toward the position of and into such openings.

A further object is to provide a device of the character described, in which the cylindrical roller member is formed as a screen-like structure of interlaced bars or rod members spaced from one another both axially and circumferentially so as to define a pattern which is preferably of a symmetrical nature.

A further object is to provide a device of the character described, comprising a perforate cylindrical compacting member having a plurality of peripherally distributed compacting projections, together with means associated with said compacting member for penetrating the perforations to thereby dislodge accumulated material therefrom, such means preferably including a plurality of projecting elements adapted to enter and withdraw from such perforations upon rotation of said member in the compacting operation.

A further object is to provide a device of the character described, which is provided with a perforation-penetrating and cleaning means arranged as a spiked roller presenting a plurality of projections adapted to enter within and withdraw from the perforations during rotation of the perforate compacting member, said roller being rotatable about an axis parallel to the axis of rotation of the perforate compacting member. As a specific object, the spiked roller is preferably arranged internally of the rotatable compacting member, and adapted to alternatively be positioned immediately inwardly of the portion of the periphery of the compacting member at which compacting pressure is being exerted, where the projections on the spiked roller are added to the compacting projections provided by the compacting member, and thus give the effect of a greater number of more closely spaced projections, or at an angularly removed portion of the periphery so that the compacting member presents a smaller number of more widely spaced compacting projections, depending upon the character of compacting operation which is desired.

The above and other objects of the invention will be brought out in or will be apparent from the following specific description of certain preferred embodiments of the invention, as illustrated in the accompanying drawings, in which.

Referring to Figs. 1 to 3, and 4, a typical device according to this invention may comprise a cylindrical roller member 1 provided with axially projecting stub shafts 2 carried in a frame or chassis 3 provided at one end with a pull attachment 4 by which the device may be drawn over the surface which is to be operated upon. The cylindrical roller 1 may comprise an inner drum member 5 provided at its respective axial ends with end wall plates 6 and a plurality of helically disposed ribs 7 which are open at the axial ends of the drum member as at 8 and provide a plurality of helical channels 9, the purpose and function of which will hereinafter be described. Symmetrically disposed about the drum member 5 we provide a screen grid member which is employed to accomplish the surface compacting operation, such grid member being shown generally at 10 and comprising a plurality of warp wires or rods 11 and weft wires or rods 12 interlaced in screen-like fashion to provide a plurality of rectangular openings 13, and the interlacing resulting in rounded projections 14 at the intersections of the warp and weft members.

Figure 2:
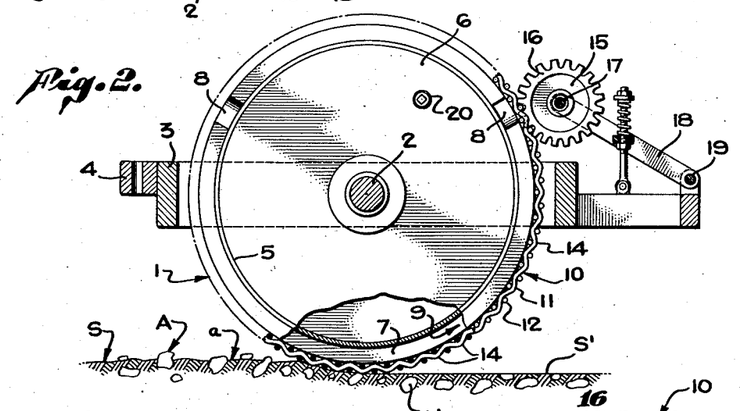
Fig. 2 is a longitudinal section thereof as taken on line 2—2 in Fig. 1.
Figure 3:
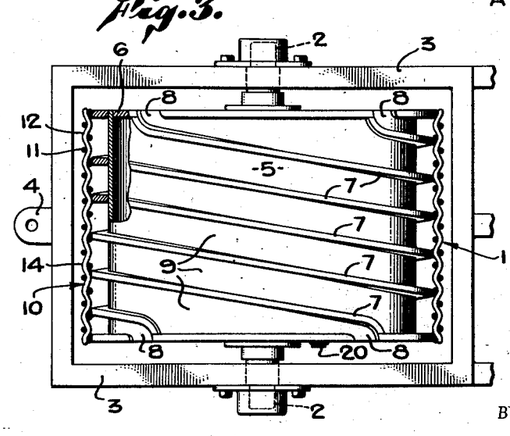
Fig. 3 is a partly sectional plan view of the form of Fig. 1, showing the exterior surface-forming member broken away.
Figure 4:
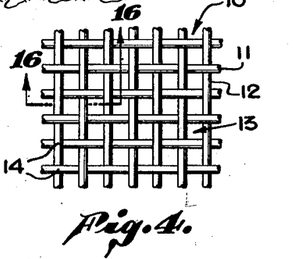
Fig. 4 is a fragmentary view of a screen-type grid member which may be employed to form the operating surface of the roller of Figs. 1–3.
Figures 16, 17:
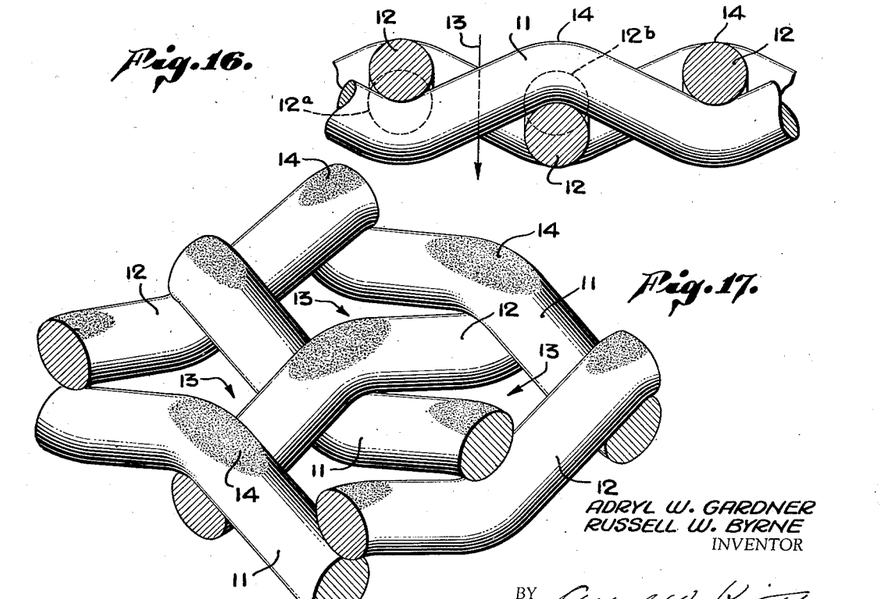
Fig. 16 is a sectional view of a screen-type operating-surface or grid member, as may be taken on line 16—16, Fig. 4, on enlarged scale.
Fig. 17 is an isometric view of the screen-like structure of Fig. 16.

The warp and weft members 11 and 12, and their interlaced arrangement, is shown on rather small scale in Figs. 2, 3 and 4, and on enlarged scale in Figs. 16 and 17, and it will be appreciated that in the ordinary case, where rather large sized aggregate is to be handled and deep compaction is desired, the structure is necessarily fairly rigid and robust. As an example, we have found that an interlaced structure of ⅝" round rod on a 1⅝" spacing, leaving rectangular openings 1 inch square between the adjacent warp and weft members, to be quite effective in ordinary road making or airfield construction, producing compaction to a depth of about 6 inches, although the utility of structures of different weight wires or rods with different sized openings will be apparent. For example where a relatively fluent cement or concrete aggregate is being treated, where a smooth surface texture is wanted, or where only shallow compaction is desired in ordinary soil, we may employ a screen structure formed of ¼" rods or wires, arranged to give a ⅜" to ½" square opening; where rather heavy aggregate is to be handled or relatively deep compaction is desired, we may use a screen structure as heavy as a ¾" rod, on an augmented spacing up to in the neighborhood of 2½" or more. Furthermore, while we have illustrated the spacing as being such as to give a square opening, it will be appreciated that it is not essential that these be actually square but may obviously be elongated in either the warp or weft direction without departing from the spirit and essential concept of this invention.

Referring to Fig. 2 in particular, a surface to be compacted is illustrated at the left-hand side at S, consisting of large sized aggregate A and a mass of smaller aggregate shown at a. As the roller device is drawn over the surface, as in a left-hand direction, the projections 14 are forced downwardly into the aggregate material, producing a relatively high concentration of pressure immediately under the intersections of the wrap and weft members, which pressure diminishes in all lateral directions toward the position of the openings 13. Where a projection 14 is imposed directly upon a large aggregate particle A, the particle is forced downwardly within the aggregate layer, as shown at A', the relative lack of pressure on the surrounding smaller aggregate particles allowing for a freedom of positional adjustment thereof and a resulting crowding toward the position of and to some extent upwardly up into the openings 13. The spaced projections 14, and in the case of interlaced bars, the adjacent portions of the bars which fall away from the position of the projections 14, serve to restrain the freedom of lateral movement, while offering no significant constraint to the upward movement of material at the position of the openings between the bars. The rounded shape of the bars at the position of the projections 14 facilitates the clean lifting of the projections away from the compacted surface as the roller device is rolled along, thus causing a minimum disturbance or "lifting" or "scuffing" of the aggregate and for this reason the compaction can be produced right up to the superior layers of aggregate material, by successive passes of the roller device over the surface. This characteristic is in marked distinction to the performance of the conventional "sheepsfoot" compacting device which is incapable of producing a compaction of the immediate surface owing to the churning action of the "feet" as they are lifted out of the upper aggregate layer.

The compacted surface obtained with a roller device of this invention results from a gradual building of the compaction upwardly from the lowermost level at which the structure is effective (depending upon the unit weight imposed at each projection, and the relative spacing of these projections from one another) to the immediate surface, as a result of successive passes, in contrast to the solely deep compaction of the "sheepsfoot" roller, or the solely immediate surface compaction of the flat steel or pneumatic types of roller. The roller device of this invention has no tendency to produce the crust-like surface compaction which so frequently results from flat steel or pneumatic rollers, but rather leaves the surface quite uniformly compacted over a relatively great depth, with a pebbled surface texture which is adapted to provide a good bond with any superimposed soil or base course layer. Where a smooth surface is preferred to the pebbled surface, the compaction may be followed by final rolling with flat steel wheels, as may be desired.

The material forced upwardly into the openings 13 may fall loosely out of the openings upon the surface over which the roller member has passed, or, depending upon the packing tendency of the material, may remain within the openings, and for this reason we preferably provide a spike roll member 15 positioned to engage the periphery of the structure 10 and offering a plurality of spikes or projections 16 which will mesh within the openings 13. The spike roll 15 is mounted for rotation about an axis 17 and is preferably carried by a support 18 pivotally attached as at 19 to some convenient portion of the framework, as to the rearward end of the chassis 3. The inner drum member 5 may be made hollow, after the manner of a closed tank, and provided with a filler opening 20 for the supply of water or the like so that the weight of the structure may be adjusted to the working condition which is encountered.

As the roller member is drawn along the surface to be compacted, the periphery of the screen grid member 10 is brought progressively into engagement with the spikes 16 on the spike roll 15, which spikes enter the perforations or openings 13 and force the material through the openings into the channels 9, which material is then conveyed axially of the structure owing to the helical disposition of the channels 9 as formed by the ribs 7 until it is carried outwardly of the channels through the openings 8 and discharged at one or the other axial end of the roller, depending upon the direction in which the roller is moved. Some of the material, sufficiently undersize to fall through the openings 13 may of course not be carried around and worked out through the openings 8, but will rather fall through the openings 13 and be laid upon the compacted surface rearwardly of the roller, where it will be in position for further compaction and incorporation in the compacted surface by repeated passes of the device, or by a flat steel, pneumatic roller or the like which may be employed in a finishing operation. The showing of the compacted surface S' at the right-hand side of Fig. 2 is somewhat idealized, inasmuch as it will be apparent that a rather pebbled surface will result owing to the crowding of finer aggregate material upwardly toward the position of and into the openings 13, and, as above mentioned, where a perfectly smooth finish is preferred to the pebbled surface, the compaction produced by a construction according to our invention may be followed by a final rolling with a flat steel roller or the like.

The discharge of finer aggregate material from the openings 13 on to the compacted surface, more particularly attained in the subsequently described forms of apparatus, is of considerable advantage in causing a layer of loose aggregate material to be superimposed upon a compacted or partially compacted surface, where it may subsequently be forced into compaction with such surface, and in some cases it is found that the amount of loose material so disposed is sufficient to provide a top surface layer which is adequate as a finishing coat or layer in the absence of added finishing material.

The pivotal mounting of the spike roll 15 will permit the roll to be thrown out of the way in the event that an oversized piece of aggregate material has lodged in an opening 13, without breaking the structure, and it is our experience that such pieces as do lodge within the openings will gradually be worked loose and fall away from the grid member 10 or will be forced through the opening into the channel spaces or passages 9, probably because of the rounded nature of the warp and weft members which form the screen and which offer very little opportunity for firm wedgement of the aggregate particles in the openings.

In general, we preferably cause the members which define the openings 13 to form tapered sidewalls which provide outwardly flaring openings, to produce the above-described lateral crowding of aggregate material toward the position of and into the openings 13 in use, and referring to Figs. 16 and 17, Fig. 16 in particular, it will be noted that the rounded cross-section of the warp and weft members 11 and 12 provide openings which actually flare outwardly and inwardly from a medial position. Assuming the lower edge of Fig. 16 to represent the inner periphery of the member 10, we have illustrated in dotted lines at 12a and 12b the location of two adjacent weft members 12 at the middle of an opening 13, from which the tapered character of the sidewalls of the openings may be visualized. The inward tapering past the geometrical middle of the structure facilitates the ejection of accumulated material from the openings into the channels 9, and where the opening-clearing means such as the spike roll 15 is located internally of the member 10 (as in certain of the subsequent described forms of invention) it will be appreciated that it is only necessary that the openings flare towards the outer periphery of the member 10, inasmuch as both the desired compaction and the facile clearing of the openings may thereby be attained.

Figure 1:
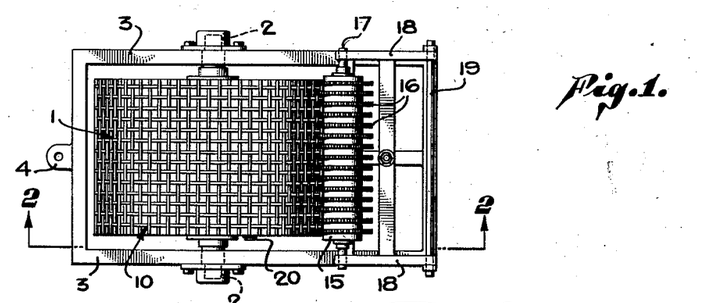
Fig. 1 is a plan view of a roller device according to our invention.
Figure 5:
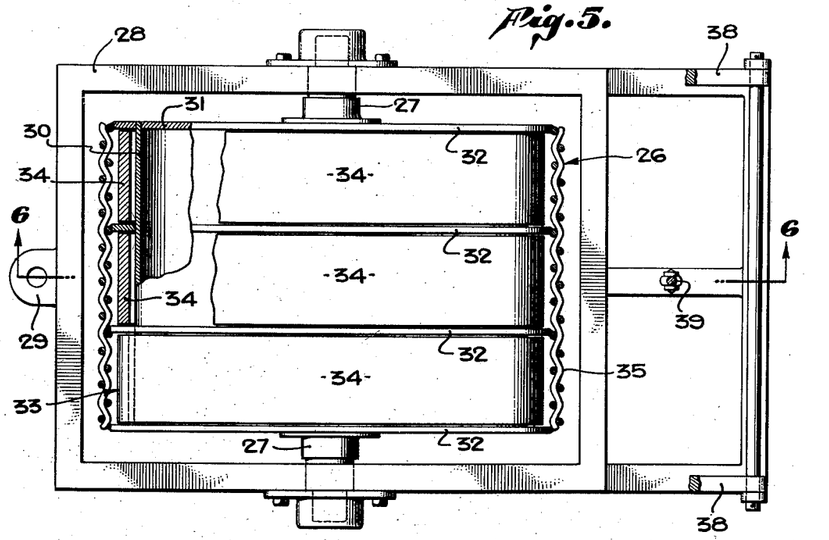
Fig. 5 is a view corresponding to Fig. 3, showing a roller device having a modified internal structure.
Figure 6:
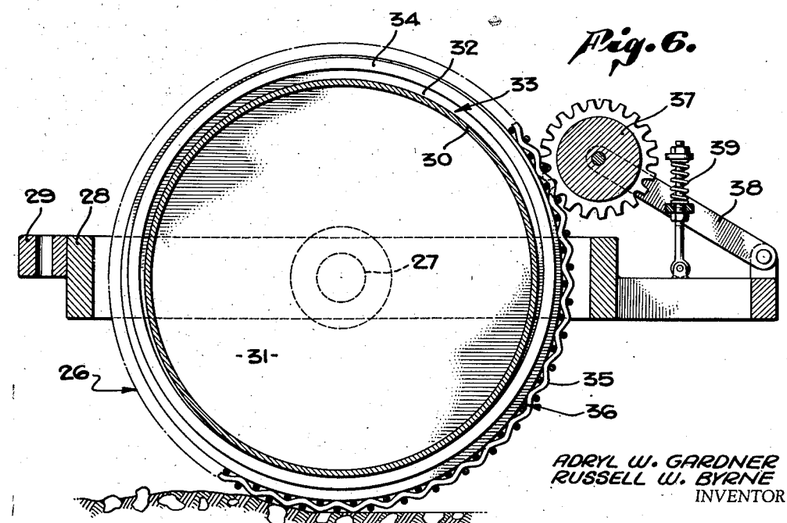
Fig. 6 is a sectional view taken on line 6—6 in Fig. 5.

The form of construction shown in Figs. 5 and 6 is generally comparable to that shown in Figs. 1 to 3, and may comprise a cylindrical roller member 26 provided with stub shafts 27 mounted on a frame or chassis 28 which is provided with a pull attachment frame at one end, as shown at 29. The roller member 26 may comprise an inner drum member 30 provided with end wall plates 31 and a plurality of intermediate peripherally extending annular ribs 32 defining annular spaces 33 surrounding the inner drum member 30. Within the annular spaces 33 floating rings 34 are provided which are of a diameter and radial thickness intermediate the outer diameter of the inner drum member 30 and the inner diameter of the screen grid member 35, which may correspond to the member 10, above. As shown in Fig. 6, the floating rings 34 will have a tendency to crowd upon material forced through the openings 36 in the screen grid member 35 at the lower portion of the roller member, as well as to exert some attrition effect upon such particles, tending to work them out of the spaces 33 for subsequent deposit upon the surface being worked upon, forwardly or rearwardly of the roller. A spike roll member 37, which corresponds in function to the one shown above at 15, is preferably carried on a swinging support 38, and we preferably also employ an adjustable stop 39 acting on the swinging support 38 to limit the inward penetration of the spikes or projections upon the roll 37, and thus minimize any wedging action thereof within the openings 36.

Figure 7:
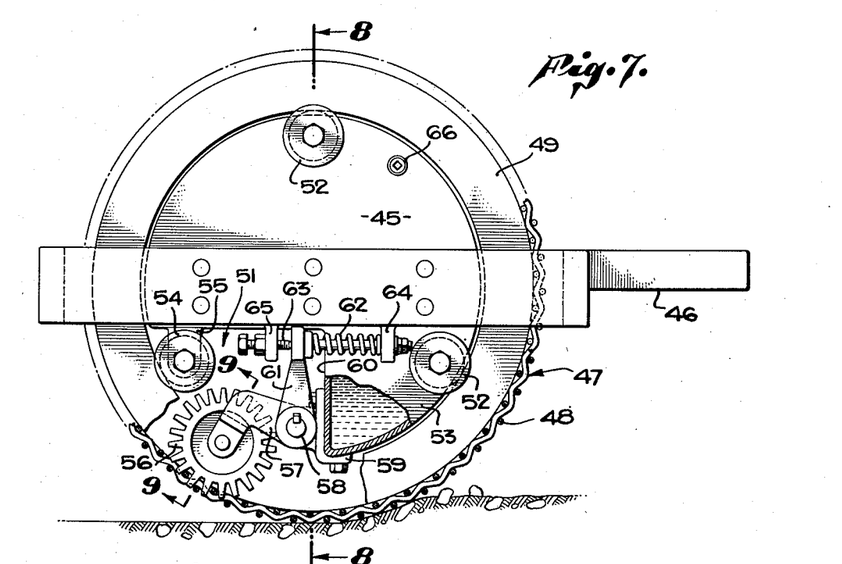
Fig. 7 is a partly broken-away side elevation of another modification of the invention.
Figures 8, 9:
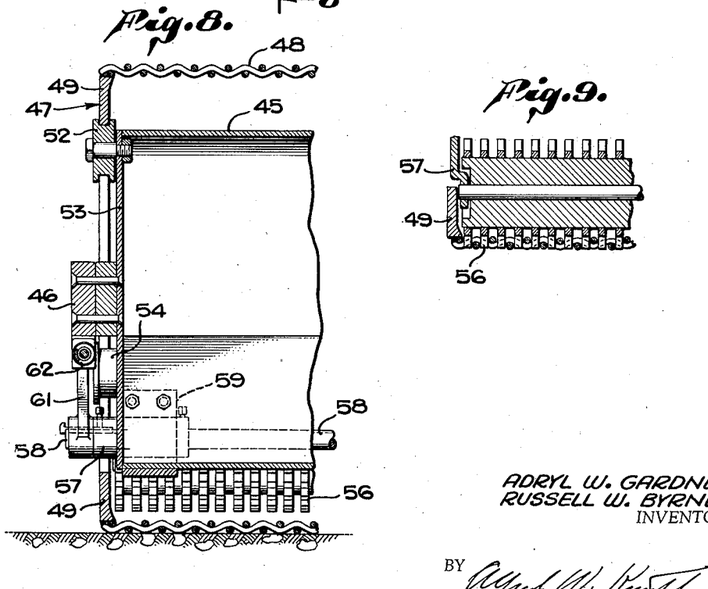
Figs. 8 and 9 are fragmentary sectional views thereof, as taken on lines 8—8 and 9—9, respectively, in Fig. 7.

The form of device shown in Figs. 7 through 9 provides for locating the means for penetrating the openings 13 in the perforate compacting member, i. e., the spike roll, at a position internally of the inner periphery of the screen grid member, so that the material which is compacted within the openings 13 will be forced outwardly thereof and deposited forwardly or rearwardly of the position of the roller depending upon the direction of movement thereof in the compacting operation. Referring to these figures, we may provide a support housing 45 which is conveniently adapted to form a weight-contributing water tank, if desired. The support housing is attached to a pull attachment frame 46 and is caused to carry a cylindrical roller member 47 which may be formed as a screen grid member 48 of cylindrical configuration. The roller member 47 is preferably provided with end support rings 49 adapted to be engaged by supporting dollies mounted on the support housing 45 and riding on the inner periphery of the rings 49. Referring to Fig. 7 in particular, it will be noted that the lower one-quarter of the support housing 45 is recessed away, as at 51, the top and right hand dollies 52 being conveniently supported directly on the end walls 53 of the housing 45, and the left-hand dolly 54 being supported on a depending lug 55.

A spike roll 56 is preferably provided within the recessed space 51 of the housing 45, being carried by bracket arms 57 pivotally supported with respect to the housing 45 through a support shaft 58 and support brackets 59 which are mounted on the vertical wall 60 of the housing 45. A spring arm 61 is provided, preferably at each end of the structure, which is adapted to engage a bias spring 62 mounted on the pull attachment frame or chassis 46, in position to resist movement of the spike roll 56 away from the inner periphery of the screen grid member 48. Suitable stop means are preferably provided as at 63 opposite the spring 62 so as to limit the degree of engagement of the spikes within the openings in the screen grid member. The spring 62 as well as the stop member 63 are preferably adjustable, and may respectively be carried on lugs 64 and 65 on the pull attachment frame. A filler opening 66 is preferably provided so that the support housing 45 may be filled with water or other suitable weighting material to any desired extent, and the weight of the roller device thereby established at a particular value for the work being accomplished.

Figure 10:
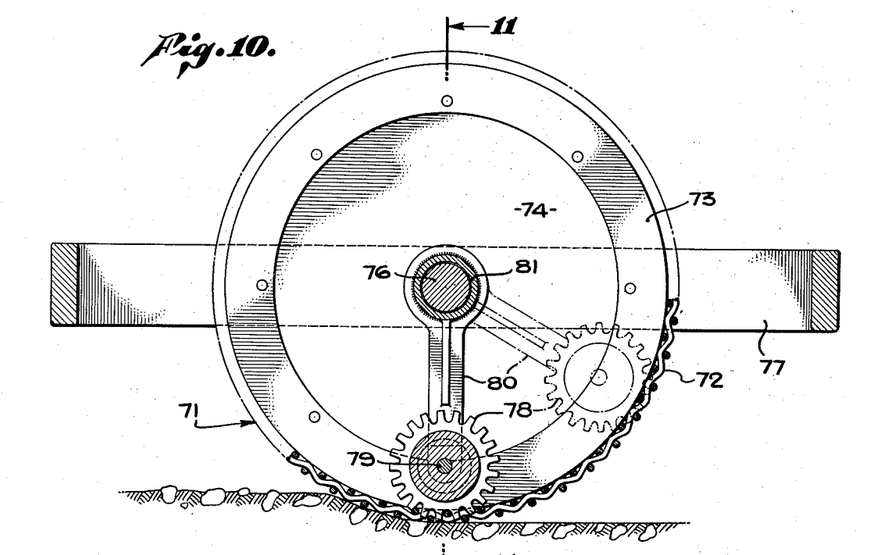
Fig. 10 is a view corresponding generally to Fig. 7, showing a further modification of the invention, in longitudinal section.
Figure 11:
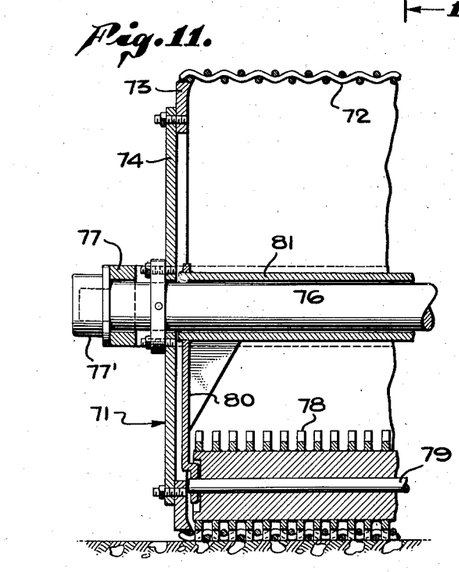
Fig. 11 is a fragmentary sectional view taken on line 11—11 of Fig. 10.

Referring to Figs. 10 and 11, the device may comprise a cylindrical roller member 71 formed by a screen grid member 72 of cylindrical conformation and provided with end rings 73 adapted to be bolted to end plates 74 which are mounted on an axially disposed support shaft 76, the outer ends of which are supported in a pull frame 77 through suitable bearings 77'. A spike roller 78 is provided in position to engage the inner periphery of the screen grid member 72, being mounted on a pivot shaft 79 carried on support arms 80 which may be carried by a support tube 81 mounted on the shaft 76, so that the roller 78 is disposed concentric with the periphery of the grid member 72. The spike roller 78 would normally be gravity biased to a vertical position as shown in full lines, and will swing upwardly along the inner periphery of the member 72 as a result of motion of the device in the rolling operation, as to a position such as shown in dot-dash lines in Fig. 10, and will thereafter roll along the inner periphery of the screen grid member 72 and act to force material outwardly of the screen grid member as described above in connection with Figs. 7 to 9.

Figure 12:
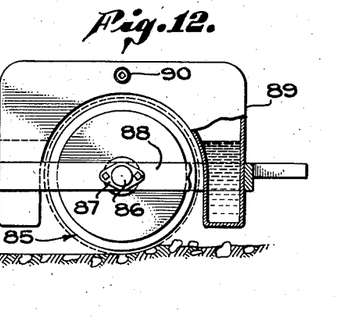
Fig. 12 is a side elevation, partly broken away, showing the adaptation of an external weight-contributing structure to our invention.

Fig. 12 illustrates the application of an external water weighting structure which may be provided for any of the above-described forms of construction, wherein a cylindrical roller 85, provided with a screen grid member of the character herein disclosed, is provided with an axial shaft 86 carried on bearings 87 upon a frame 88 which carries a surrounding water tank 89 provided with a filling opening 90, all as is fairly common practice in connection with other types of roller means well known to the art.

Figure 13:
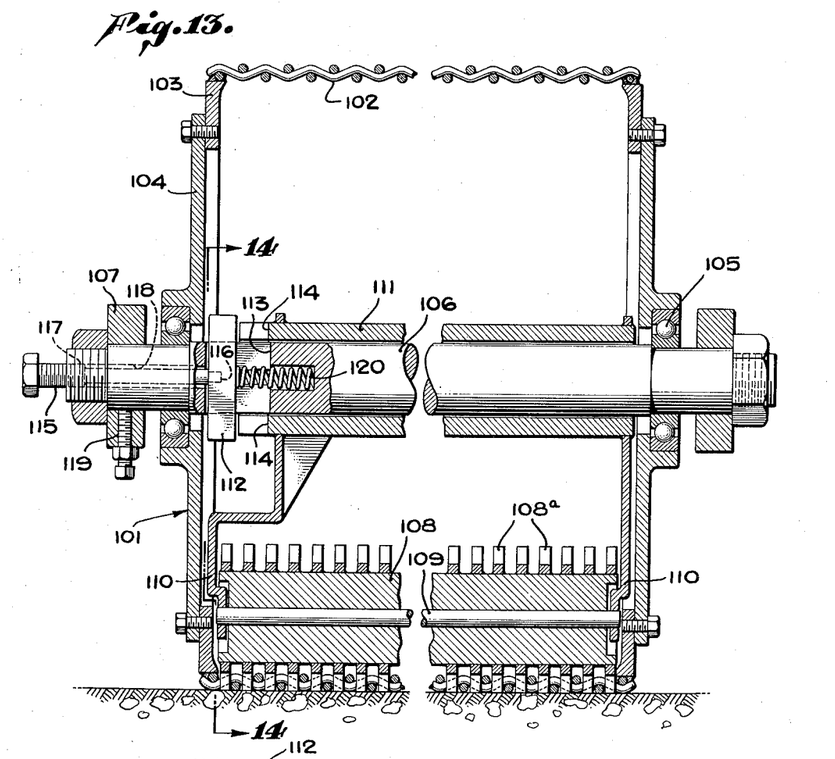
Fig. 13 is a transverse or axial section of a modification of the structure shown in Figs. 10 and 11.
Figure 14:
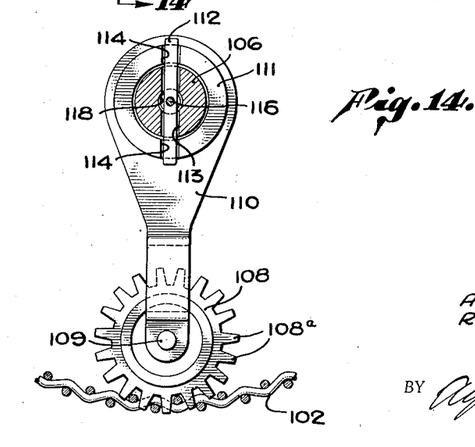
Fig. 14 is a sectional detail as taken on line 14—14 in Fig. 13.

Referring to Figs. 13 and 14 a further modification of this structure may comprise a roller member 101 defined by a perforate cylindrical grid member 102 and supporting end rings 103 bolted to end plates 104, rotatably mounted as at 105 on a fixed shaft 106 secured to chassis 107. A spike roll 108 is carried internally of the structure in position to mesh with the grid member 102, the spike roll being provided with a pivot shaft 109 and support arms 110 carried by a support tube 111 rotatably disposed on the shaft 106.

In this particular form of device, the spike roll 108 is adapted to ride in a free-swinging fashion about the pivot defined by the shaft 106 within the drum member 101 after the manner of the form shown in Figs. 10 and 11, or, to be fixed in the depending full line position illustrated in Fig. 10 so that the spike roll is caused to be maintained immediately inwardly of the lower portion of the periphery of the roller member 101 where it bears upon the surface to be compacted. The means for positioning or holding the spike roll 108 in this vertical depending position may comprise a locking sear 112 slidably disposed within a slot 113 in the shaft 106 and adapted for lateral movement between a clearance position as illustrated in Fig. 13 into engagement with a pair of diametrically opposed notches 114 in the support tube 111, as through the agency of an actuating rod 115 piloted within the sear 112 at its inner end, as at 116, and threadedly mounted as at 117 in a bore 118 in the shaft 106. The actuating rod 115 may be screwed inwardly of the shaft 106, forcing the sear 112 in a right hand direction into the notches 114, when it is desired to lock the spike roll assembly in fixed position, and in order to insure that the shaft 106 does not rotate with respect to the chassis 107, keying means such as shown at 119 may be employed. A spring member 120 may be provided within the bore 118 to bias the sear in an outward direction against the piloted end of the actuating rod 115.

As may be seen from Figs. 13 and 14, the presence of the projections 108a of the spike roll in the openings between the warp and weft elements defining the grid member 102 at the point where pressure is applied to the aggregate material in the compacting operation has the effect of increasing the number of projections 14 (referred to above in connection with Figs. 1 to 4), with a corresponding increase in the number and reduction in size of the spaced openings between the projections. This results in a roller device which makes available two different meshes of grid, coarse and fine, having entirely different compacting characteristics. In use, the roller may first be passed over the aggregate with the spike roll assembly in unlocked condition, for deep compaction of the aggregate material as above described, and when it is desired to produce a more finished texture and secure a high degree of surface compaction, the spike roll assembly may be locked in place and the roller device again passed over the aggregate surface.

Figure 15:
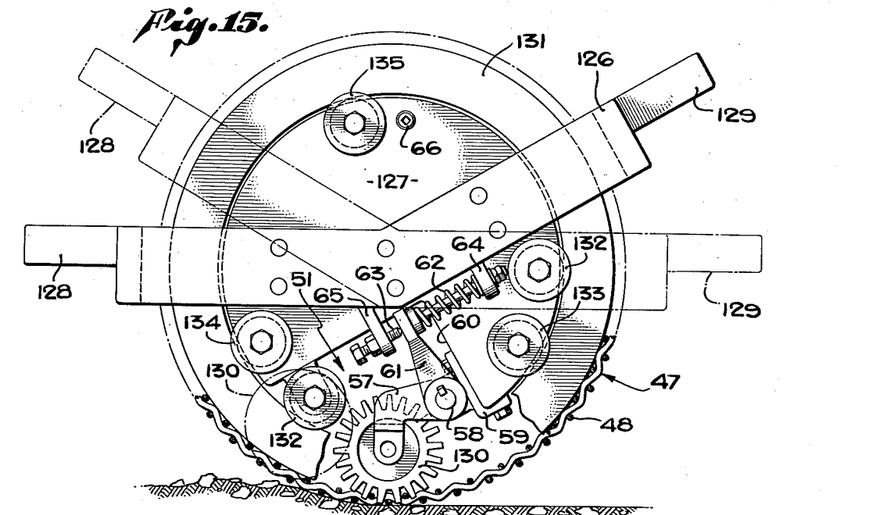
Fig. 15 is a view corresponding to Fig. 8, showing a modification of that particular structure to provide a device adapted for differing compacting actions.

In Fig. 15 we have illustrated a modification of the form of structure shown in Fig. 7 which adapts it to conversion to provide both coarse and fine meshed rollers. The same reference numerals are used in Fig. 15 as in Fig. 7, except where structural distinctions are involved, and referring thereto, a chassis 126 carrying a support housing 127, corresponding to the one shown at 45 above, is provided with pull attachments 128 and 129 at opposite ends, arranged at an angle of approximately 150° to one another to provide a prescribed angular relation to the position of the clearing means provided for the grid member 47, so that when the device is pulled in a right hand direction by attachment 129 (dot-dash position of the chassis 126), the spike roll 130 will be inclined some 30° rearwardly of the vertical, as to the position shown by dot-dash circle 130, a position corresponding to that of the spike roll 56 of Fig. 7 when the device is pulled in a left hand direction by attachment 128, the spike roll 130 will be in the full line position of Fig. 15, corresponding to the position of the spike roll 108 of Fig. 13. The chassis 126, in this form of the invention, defines the means for positioning the spike roll in the two operative positions.

In order to provide a better distribution of the weight of the support housing on the end rings 131 in both operating positions, we may provide an additional pair of support dollies 132 spaced 30° clockwise of the dollies 133 and 134, which correspond to the lower dollies 52 and 54 of Fig. 7. The dolly 135, corresponding to the dolly 52 at the top of Fig. 7, may be spaced 105° from the dollies 132, so as to be more symmetrically located with respect to the plurality of dollies 132–134 in both operative positions of the structure.

Figure 18:
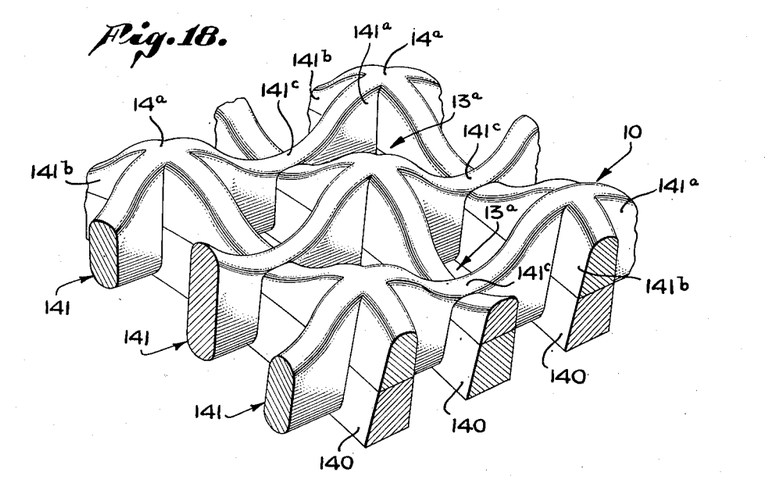
Fig. 18 is a fragmentary showing of an alternative type of operating-surface structure, formed of cooperating transversely disposed circumferentially and longitudinally extending elements adapted to form a grid structure having a plurality of spaced openings and a plurality of surface projections, each projection having a plurality of openings spaced thereabout.
Figure 19:
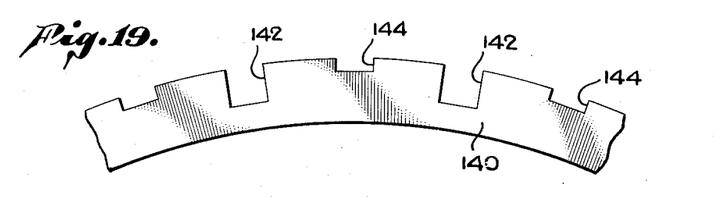
Fig. 19 is a fragmentary side elevation of one of the circumferentially extending elements of Fig. 18.
Figures 20, 21:
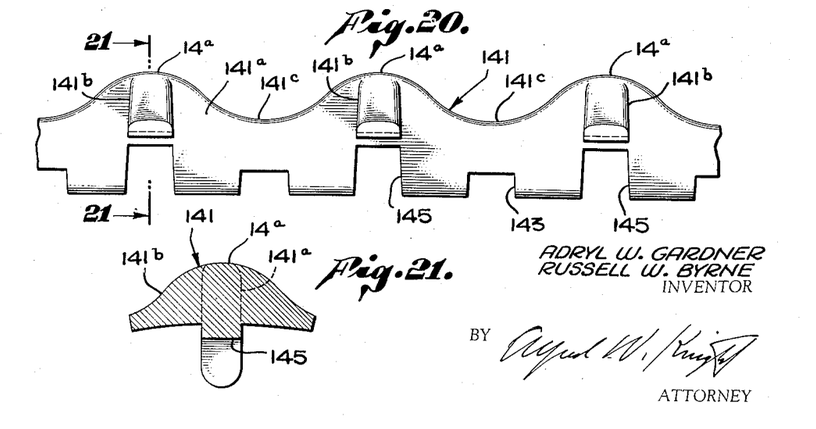
Fig. 20 is a fragmentary longitudinal elevation of one of the longitudinally extending elements of Fig. 18.
Fig. 21 is a transverse sectional detail as taken on line 21—21 of Fig. 20.

Referring to Figs. 18 to 21 we have illustrated a modified assembly which may be used to form the screen-like structure 10, which may comprise a plurality of axially spaced annular support rings 140 adapted to support a plurality of longitudinally extending projection or protuberance members 141 adapted to provide the desired interspersed projections 14 and openings 13 (14a and 13a in Fig. 18). These projection members 141 may be formed after the manner illustrated in Figs. 20 and 21, as by a casting operation, with a longitudinally extending rib 141a and branch ribs 141b at the position of alternate support rings 140, the intersections of the members 141a and 141b providing projections 14a corresponding to the projections 14 described above by assembling successive ones of the projection members 141 on the support rings 140 in such a manner that the projection 14a of one projection member 141 will lie opposite a depression 141c of the next adjacent projection member. The support rings and projection members may be coactingly notched as at 142—143 and 144—145, to provide an interlocking assembly. In assembling the structure to form a cylindrical roller member, the annular support rings 140 are arranged in axially spaced relationship corresponding to the spacing of the notches 143 and 145 in the projection members 141, the size of the projection members 141 being such with respect to the diameter of the roller member which is to be formed that an even number of projection members will be utilized, a deep notch 142 of one support ring being longitudinally aligned with a shallow notch 144 of the next adjacent support ring. The projection members 141 are then assembled within the notches 142 and 144, the deep notch 145 meshing with the shallow notch 144, and welded or otherwise attached in place.

The radial disposition of the projection members 141, as may be visualized from the radial arrangement of the notches 142 and 144 of the support ring 140 (Fig. 19) will cause the openings 13a to have their circumferentially opposed side walls flaring outwardly, and in order to obtain a similar outward flaring in the longitudinally opposed side walls defining such openings we may taper the support rings 140 and the cross ribs 141b outwardly to approximate conformity to the tapering provided between the opposed circumferential side walls. This outward flaring provides for the desired lateral crowding of aggregate material toward the position of and into the openings 13a, and further facilitates the facile clearing of these openings by use of an internally disposed device which may be caused to project into and be withdrawn from the openings.

It is intended that a structure of the type illustrated in Figs. 18 to 21 would be employed for structures which are too robust to be readily fabricated by a weaving technique such as would be employed in the formation of the woven type of grid member shown above, it having been found impracticable with present available fabricating methods to weave screen structures with rods heavier than about 5/8" diameter. By employing a structure of the type shown in Fig. 18, it will be apparent, the equivalent weight and spacing of the warp and weft members may be established at any desired value, depending upon the type of compaction which is to be attained by use of this structure.

Other structures than those illustrated herein will undoubtedly occur to those skilled in the art, and we do not choose to consider our invention as limited to these specific showings, but rather to the scope of the subjoined claims. For example, while we have illustrated the locked position of the spike roll 108 (Figs. 13 and 14) as being vertically below the roller axis as defined by the shaft 106, it is to be appreciated that this position may be considerably removed from a strict vertical without departing from the scope of our concept, inasmuch as it is only necessary that the roll be located at the portion of the periphery of the roller device which is in compacting contact with the aggregate over which the device is being passed. In some cases it may be advantageous to locate the spike roll at a position forwardly from the portion of the periphery which is vertically below the axis of the roller. The more completely compacted the aggregate material is, the closer to the vertical the spike roll should be; the more "fluff" the aggregate material has, the farther the roll may be located from the vertical position.

We claim:

1. In a roller-type aggregate compacting device, the combination which comprises: grid means of hollow cylindrical configuration mounted for rotation about its axis, said means being provided with a plurality of spaced openings extending generally in a radial direction therethrough and distributed peripherally thereon in a symmetrical pattern, and solid elements extending between adjacent openings to define alternate outwardly disposed compacting surface portions and open-ended depressions; and means associated with said grid means for penetrating said openings to thereby dislodge accumulated material therefrom, said last-named means including projecting gear-like elements engaging the surface of the grid means and of a size and spacing to enter within and withdraw from each of said openings during rotation of said grid means.

2. In a roller-type aggregate compacting device, the combination which comprises: grid means of hollow cylindrical configuration mounted for rotation about its axis, said means being provided with a plurality of spaced openings extending generally in a radial direction therethrough and distributed peripherally thereon in a symmetrical pattern, and solid elements extending between adjacent openings to define alternate outwardly disposed compacting surface portions and open-ended depressions; and a plurality of gear-like cleaning elements located exteriorly of said grid means in contact with a portion of the grid means and having teeth projecting therefrom in position to project inwardly toward the axis of rotation of said grid means, said teeth on the cleaning elements being spaced to penetrate each of said openings and be withdrawn therefrom during rotation of said grid means.

3. In a roller-type aggregate compacting device, the combination which comprises: grid means of hollow cylindrical configuration mounted for rotation about its axis, said means being provided with a plurality of spaced openings extending generally in a radial direction and distributed peripherally thereon in a symmetrical pattern, and solid elements extending between adjacent openings to define alternate outwardly disposed compacting surface portions and open-ended depressions; and a plurality of cleaning elements including supports mounted interiorly of said grid means for movement relative to said grid means about said axis and having rotationally mounted parts thereon adjacent the inner periphery of said grid means which are of a shape and size to project outwardly into and be withdrawn from said openings during rotation of said grid means.

4. In a roller-type aggregate compacting device, the combination which comprises: grid means of hollow cylindrical conformation mounted for rotation about its axis, said means being provided with a plurality of spaced openings extending generally in a radial direction therethrough and distributed peripherally thereon in a symmetrical pattern in which the openings are arranged in a plurality of adjacently disposed axially separated circumferential rows, with the openings in any row being substantially equidistant from one another, and with solid elements extending between adjacent openings, to define alternate outwardly disposed compacting surfaces and open-ended depressions; means associated with said grid means for penetrating said openings to thereby dislodge accumulated material therefrom, said penetrating means comprising a support rotatable relative to the axis of the grid means and carrying a plurality of gear-like elements arranged in a plurality of parallel planes spaced axially in conformity with the spacing of said rows of openings and having their radially outward end portions spaced circumferentially in conformity with the circumferential spacing of said openings; and means for mounting said gear-like elements for rotation about an axis parallel to the axis of said grid means with such outward end portions meshing with said openings in such manner as to cause one of said gear-like elements to move into and out of each of said openings during each rotation of said grid means.

5. A construction as set forth in claim 4, said penetrating means being disposed externally of said grid means.

6. A construction as set forth in claim 4, said penetrating means being disposed internally of said grid means with said projecting elements functioning outwardly into meshing engagement with said openings.

7. In a roller-type aggregate compacting device, the combination which comprises: grid means of cylindrical configuration mounted for rotation about its axis, said means being provided with a plurality of spaced openings extending generally in a radial direction and distributed peripherally thereon, and solid elements extending between adjacent openings to define alternate outwardly disposed compacting surface portions and open-ended depressions; clearing means for said openings mounted internally of said grid means and including a support structure rotatable relative to said grid means and a plurality of cleaning elements rotatable relative to the support structure and of a shape and size to penetrate said openings, and means for moving said cleaning elements into and out of said openings during rotation of said grid means; and positioning means adapted to locate said clearing means at the portion of the periphery of said grid means which is in compacting contact with the aggregate over which the compacting device is passed in use.

8. A construction as set forth in claim 7 and comprising in addition: a chassis upon which said grid means is mounted for rotation, said chassis being provided with pull attachment means at each lateral side of the axis of rotation of said grid means whereby said roller device may be drawn over a surface to be compacted in either transverse direction normal to the axis of rotation of said grid means, said clearing means being supported on said chassis and thereby adapted to be positioned with respect to different portions of the periphery of said grid means in response to the location of said chassis in different angular positions about the axis of rotation of said grid means, and said positioning means being defined by said chassis and one of said pull attachment means, the angular relationship between said clearing means and said one pull attachment means being such as to locate said clearing means at the said portion of the periphery of said grid means which is in compacting contact with the aggregate layer when said device is being drawn over such layer by said one pull attachment means.

9. In a roller-type aggregate compacting device, the combination which comprises: grid means of hollow cylindrical configuration mounted for rotation about its axis, said means being provided with a plurality of spaced openings extending therethrough in a generally radial direction and distributed over the periphery in a symmetrical pattern consisting of rows of openings extending axially and other rows extending at substantially right angles thereto, and solid elements extending between adjacent openings to define alternate outwardly disposed compacting surface portions and open ended depressions; and a cleaning member rotatably mounted adjacent the grid means with its axis substantially parallel to the grid axis and having a plurality of radial spikes arranged in a pattern similar to the pattern of said openings to mesh therewith, the spikes entering the openings to clean them and engage said solid elements to rotate the cleaning member about its axis.

10. In a roller-type aggregate compacting device, the combination which comprises: grid means of hollow cylindrical configuration mounted for rotation about its axis and having a plurality of spaced openings extending therethrough in a radial direction and disposed peripherally thereon, and solid elements extending between adjacent openings to define alternate outwardly disposed compacting surface portions and open ended depressions; a cleaning member having a plurality of cleaning elements adapted to penetrate said openings; and supporting means for said cleaning member mounting the cleaning member interiorly of the grid means and adjacent the grid to rotate about an axis substantially parallel to the grid axis, and means for biasing the cleaning member toward contact with the grid means at a definite location but yielding to allow movement of the cleaning member away from said location.

11. A roller-type aggregate compacting device as in claim 10 in which the supporting means for the cleaning member includes an arm pivotally mounted at one end and carrying the cleaning member at the other end to permit movement of the cleaning member about said pivotal mounting when over-sized aggregate is lodged in an opening of the grid means.

12. In a roller-type aggregate compacting device, the combination which comprises: grid means of cylindrical configuration mounted for rotation about its axis, said means being provided with a plurality of spaced openings extending generally in a radial direction and distributed peripherally thereon, and solid elements extending between adjacent openings to define alternate outwardly disposed compacting surface portions and open-ended depressions; clearing means for said openings mounted interiorly of said grid means and including a support structure rotatable relative to said grid means and a plurality of cleaning elements rotatable relative to the support structure and of a size and shape to penetrate said openings, and means for moving said cleaning elements into and out of said openings during rotation of said grid means; and positioning means adapted to locate said cleaning means at a portion of the periphery of said grid means which is in compacting contact with the aggregate over which the compacting device is passed in use, said clearing elements comprising a spiked roller member mounted for rotation about an axis parallel to the axis of rotation of the grid means and carried by the support structure, said support structure being pivotally mounted for free swinging movement about the axis of rotation of said grid means, and said positioning means comprising locking means adapted to engage said support structure to constrain the same against free swinging movement.

13. In a roller-type aggregate compacting device, the construction which comprises: a chassis; a cylindriform support housing having its axially-directed ends secured to said chassis; and a tubular compacting member of circular cross-section coaxially surrounding said support housing in radially spaced relation thereto; pivotal support means defining a rotatable support for said compacting member on said support housing and chassis, said compacting member being provided with a plurality of spaced openings distributed over the periphery of said compacting member and in communication with the space between said compacting member and said housing, and extending generally in a radial direction, said openings in said compacting member being distributed in a symmetrical pattern in which the openings are arranged in a plurality of adjacently disposed circumferential rows, with the openings in any row being substantially equidistant from one another, and comprising in addition means associated with said compacting member for penetrating said openings to thereby dislodge accumulated material therefrom, said penetrating means comprising a plurality of radially disposed projecting elements arranged in a plurality of parallel planes spaced axially in conformity with the spacing of said rows of openings and having their radially outward end portions spaced circumferentially in conformity with the circumferential spacing of said openings; means for mounting said projecting elements for rotation about an axis parallel to the axis of said compacting member with such outward end portions meshing with said openings, said mounting means including pivotal support means and spring bias means resiliently urging said spiked roller member outwardly toward engagement with said compacting member and including stop means limiting the degree of such engagement.

14. In a roller-type aggregate compacting device, the combination comprising grid means of hollow cylindrical configuration mounted for rotational movement over the aggregate to be compacted thereby, said grid means having a central longitudinal axis and an outer compacting surface defined by series of axial and circumferential ribs intersecting at spaced positions to form a pattern embodying axial and circumferential rows of substantially rectangular openings which are radial to said axis, opposed portions of said ribs defining each of said openings diverging from one another outwardly of the grid means and being substantially free of interstices for the accumulation and holding of aggregate, the outer surfaces of each of said ribs being longitudinally sinuous in contour so as to provide successive high and low areas for contact with the aggregate which are related in spacing to the separation of the ribs.

15. In a roller-type aggregate compacting device as defined in claim 14, the combination being further characterized by support means mounted within the grid means for rotational movement relative to the grid means about the said longitudinal axis thereof, cleaning elements mounted for rotation on said support means and having teeth projecting outwardly therefrom in spaced relationship to one another, said teeth being arranged in a pattern conforming to that of the openings and meshing therewith, and means for determining the position of the support means so that successive teeth enter sequential openings circumferentially of the grid means as the grid means is rotated.

16. In a roller-type aggregate compacting device having grid means of hollow cylindrical configuration and adapted to be cleaned during use by the progressive and continued movement along the inner surface thereof of rotary elements having spaced outwardly projecting teeth thereon, the combination comprising laterally disposed series of ribs with the ribs of each series spaced apart and intersecting the ribs of the other series to form said grid means of hollow cylindrical configuration, the inner surfaces of said ribs defining a relatively smooth inner cylindrical surface interiorly of the grid means, said ribs being configured and joined so as to avoid interstices for the collection and accumulation of aggregate, opposed surfaces of said ribs diverging from one another on opposite sides of said openings, and the outer surfaces of said ribs being longitudinally contoured to form a pattern of alternated bumps and depressions.

ADRYL W. GARDNER.
RUSSELL W. BYRNE.

REFERENCES CITED

The following references are of record in the file of this patent:

UNITED STATES PATENTS

| Number | Name | Date |
|---|---|---|
| 1,570,582 | Thompson | Jan. 19, 1926 |
| 1,626,879 | Shidler et al. | May 3, 1927 |
| 2,109,851 | Schumacher | Mar. 1, 1938 |
| 2,261,893 | Wolfard | Nov. 4, 1941 |
| 2,334,973 | Whiteman | Nov. 23, 1943 |